Nov. 16, 1965    J. P. NELSON ETAL    3,217,844
AIR COOLED DISC BRAKE

Filed May 21, 1963    2 Sheets-Sheet 1

INVENTOR.
JOSEPH F. DERNOVSHEK
JOHN P. NELSON
BY
*J.B. Holden*
ATTORNEY

Nov. 16, 1965

J. P. NELSON ETAL 3,217,844

AIR COOLED DISC BRAKE

Filed May 21, 1963

INVENTOR.
JOSEPH F. DERNOVSHEK
BY JOHN P. NELSON

*J.B. Holden*
ATTORNEY

United States Patent Office 3,217,844
Patented Nov. 16, 1965

3,217,844
AIR COOLED DISC BRAKE
John P. Nelson and Joseph F. Dernovshek, Akron, Ohio, assignors to The Goodyear Tire & Rubber Company, Akron, Ohio, a corporation of Ohio
Filed May 21, 1963, Ser. No. 281,868
4 Claims. (Cl. 188—264)

This is a continuation-in-part of application Serial No. 211,585, filed July 23, 1962, now abandoned.

This invention relates to multiple disk type brakes for aircraft and the like, and, more particularly, to the air cooling of such brakes.

The energy absorbing demands upon an aircraft brake in stopping a relatively heavy aircraft over a relatively short runway distance and corresponding short period of time are very considerable so that the aircraft brakes become very hot. The relatively large amount of heat imparted to a multiple disk airplane brake during a normal landing has a limiting effect upon the turn around time of the aircraft, i.e. the time that the aircraft can be again taken off. This is because of the possibility that during take-off after the airplane has started down the runway, the take-off may be rejected because the aircraft is not properly coming up to a flying speed, or the like, in which event it is necessary to apply the brakes very hard to stop the airplane before it runs out of runway. In fact, a rejected take-off is one of the most demanding of brake requirements, and unless the brake has a temperature of less than about 400° F. at the time of the airplane starting its take-off run, the brake will not perform satisfactorily in the event that the take-off is rejected and the brake is forcefully reapplied.

It has been proposed heretofore to cool brakes artificially by air or water, normally during braking, to improve brake operation, to reduce the "turn around" time of the airplane, etc., but known devices for this purpose have proven impractical, usually adding objectionably to the weight, size, and price requirements of the brake.

It is the general object of the present invention to avoid and overcome the foregoing and other difficulties of and objections to prior art brakes and to provide an efficient, simple, economical, lightweight brake having a minimum of maintenance and whereby the turn around time of an aircraft can be notably shortened.

Another object of the invention is the provision of forced draft air cooling of multiple disk brakes wherein the air cooling means adapt themselves to conventional brake constructions, and with the air cooling means being characterized by the lightness of weight and smallness of space requirements.

A further object of the invention is to provide an air cooled brake in which a plurality of small high speed fans are positioned in the torque plate of the brake, and which draw air through openings in the wheel flange and the torque plate, over the outer periphery of and through the stack of brake disks over the hydraulic pressure means and under the inner tire bead retaining seat, and discharge the air in a plurality of columns through the torque plate.

The foregoing objects of the invention, and other objects which will become apparent as the description proceeds, are achieved by the provision of, in an aircraft brake, a fixed axle, a wheel rotatably mounted on the axle, said wheel having a radially directed supporting web with circumferentially spaced openings therein, a torque plate with circumferentially spaced openings therein fixed to the axle, a torque hub fixed to the plate and extending between the axle and the wheel, a stack of brake disks, every other disk being splined to the torque hub and alternate disks being splined to the inside of the wheel, hydraulic means carried by the torque plate and adapted to engage the stack of disks with each other, a pressure plate fixed to the torque hub against which the stack of disks is pushed by the hydraulic means, a plurality of fans mounted at circumferentially spaced points in the torque plate adjacent the outer periphery of the disks, and an individual high speed motor drive for each fan for drawing air through the openings in the wheel web and the torque plate, over the outer periphery of and through the stack of disks, over the hydraulic pressure means and under the inner tire bead retaining seat, and through the fan openings in the torque plate.

For a better understanding of the invention, reference should be had to the accompanying drawings, wherein.

Figure 1:
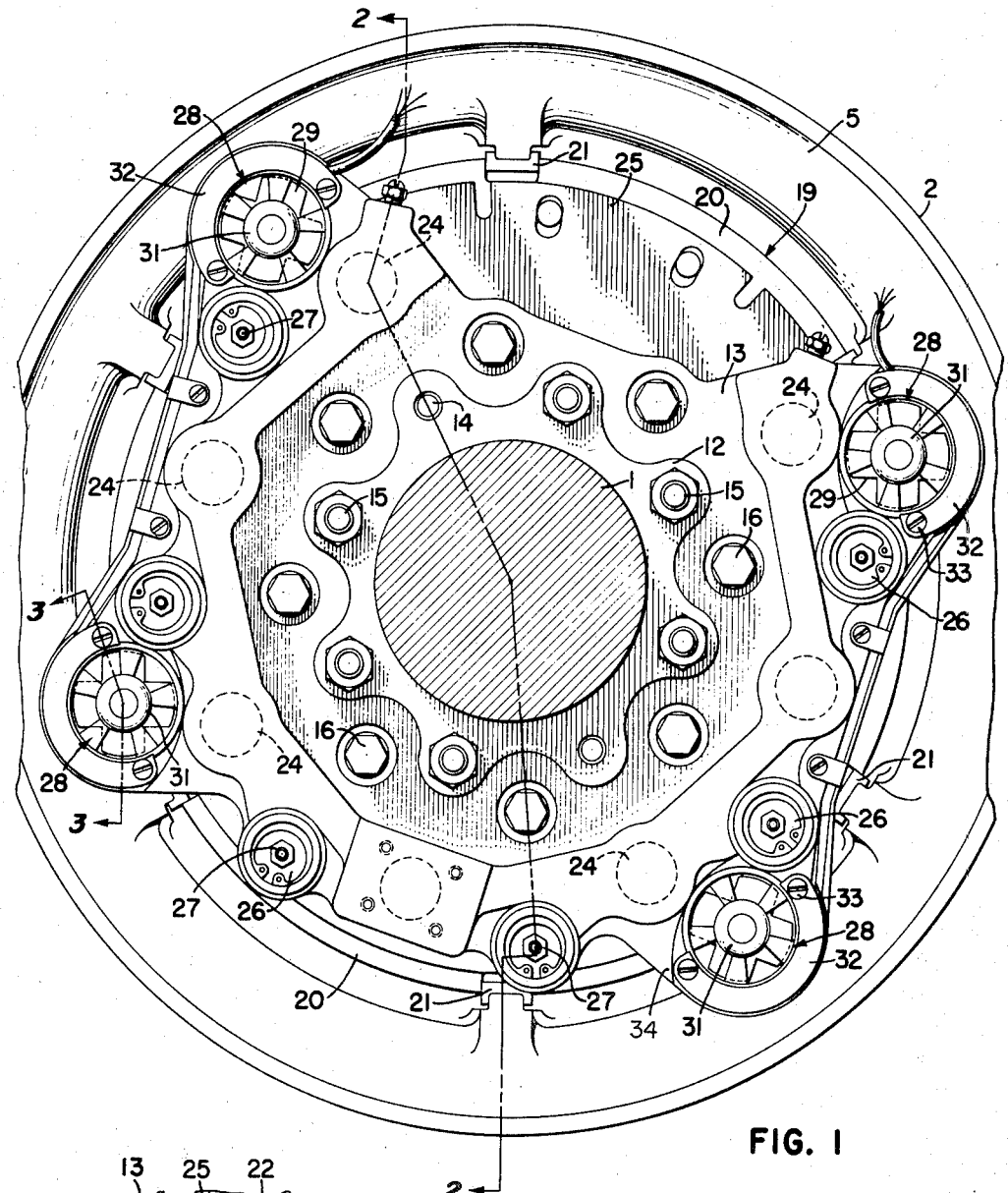
FIG. 1 is an end elevation of one best known embodiment of a wheel and brake assembly incorporating the invention.

Although the principles of the invention are broadly applicable to any type of brake, the invention is usually employed with large commercial aircraft brakes and hence it has been so illustrated and will be so described. In the case of commercial airline brakes, disc stack temperatures and axle temperatures do not constitute the critical problems. Rather, the critical temperatures, which dictate the turn-around availability of an aircraft, are those of wheel bead seat and fluid cavities. Therefore, with this in mind the invention contemplates the use of an auxiliary cooling system mounted around the outer periphery of the brake to effect cooling of the fluid cavities and bead seats as well as the disc stacks to substantially reduce aircraft turn around time. Apparatus to achieve these effects is described hereinafter with reference to the drawings.

In the drawings, the numeral 1 indicates a fixed axle upon which a wheel indicated generally by the numeral 2 is rotatably mounted, as by bearings 3 and 4. The wheel 2 is illustrated as formed in two halves 5 and 6 connected together with bolts 7. The wheel 2 is formed with an outer peripheral rim portion terminating in bead seats 8 and 9 for receiving the tire beads of a pneumatic tire adapted to be mounted upon the wheel. The wheel 2 is provided with an integral radially-directed supporting web 10 having circumferentially spaced openings 11 and 11a extending laterally therethrough and through which air is drawn during the cooling of the brake assembly.

The axle 1 is formed with a flange 12 to which is secured a torque plate indicated as a whole by the numeral 13. Dowel pins 14 and bolt means 15 secure the torque plate 13 on the axle flange 12. Fastened to the torque plate 13 as by a plurality of circumferentially spaced bolts 16 is a torque hub 17. The bolts 16 also hold a back pressure plate 18 in position at the outboard end of the torque hub 17. A plurality of lightening holes 17a are provided in the torque hub 17 to assist in decreasing the weight of the wheel structure, and to assist in the cooling air circulation described hereinafter.

It will be recognized that the wheel 2 is formed so that each half 5 and 6 is provided with considerable overhang in an axial direction with relation to the center radial web 10 of the wheel. This provides a considerable space between the torque hub 17 and the inner periphery of the wheel half 5, and in this space is received a stack of disks indicated as a whole by the numeral 19. Alternate disks 20 are splined at their outer peripheries to splines 21 secured at circumferentially spaced points around the inner periphery of the wheel half 5 leaving space for passage of air around the stack of disks. Brake disks 22 interposed between each of the alternate disks 20 are splined at their inner peripheries upon the torque hub 17 or enlarged portions, such as ribs 23 through which the bolts 16 extend.

The torque plate 13 is provided with a plurality of circumferentially spaced pistons 24 and movable against a pressure plate 25 for compressing the stack of disks 19 against the end pressure plate 18 when hydraulic fluid is supplied behind the pistons 24.

Carried at spaced points around the torque plate 13 are spring means 26 connected by rods 27 to the end pressure plate 25 to resiliently hold the pressure plate 25 in non-braking relation with the stack of disks 19.

In order to provide cooling air for the fluid cavities of the pistons 24, a plurality of holes 13a through torque plate 13 are provided so that air is drawn therethrough to pass over the exposed portion of the pistons 24 during air cooling of the brake assembly.

Figure 3:
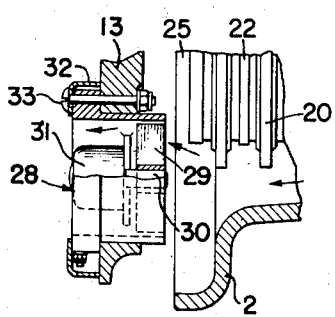
FIG. 3 is a fragmentary sectional view taken substantially on line 3—3 of FIG. 1.
Figure 2:
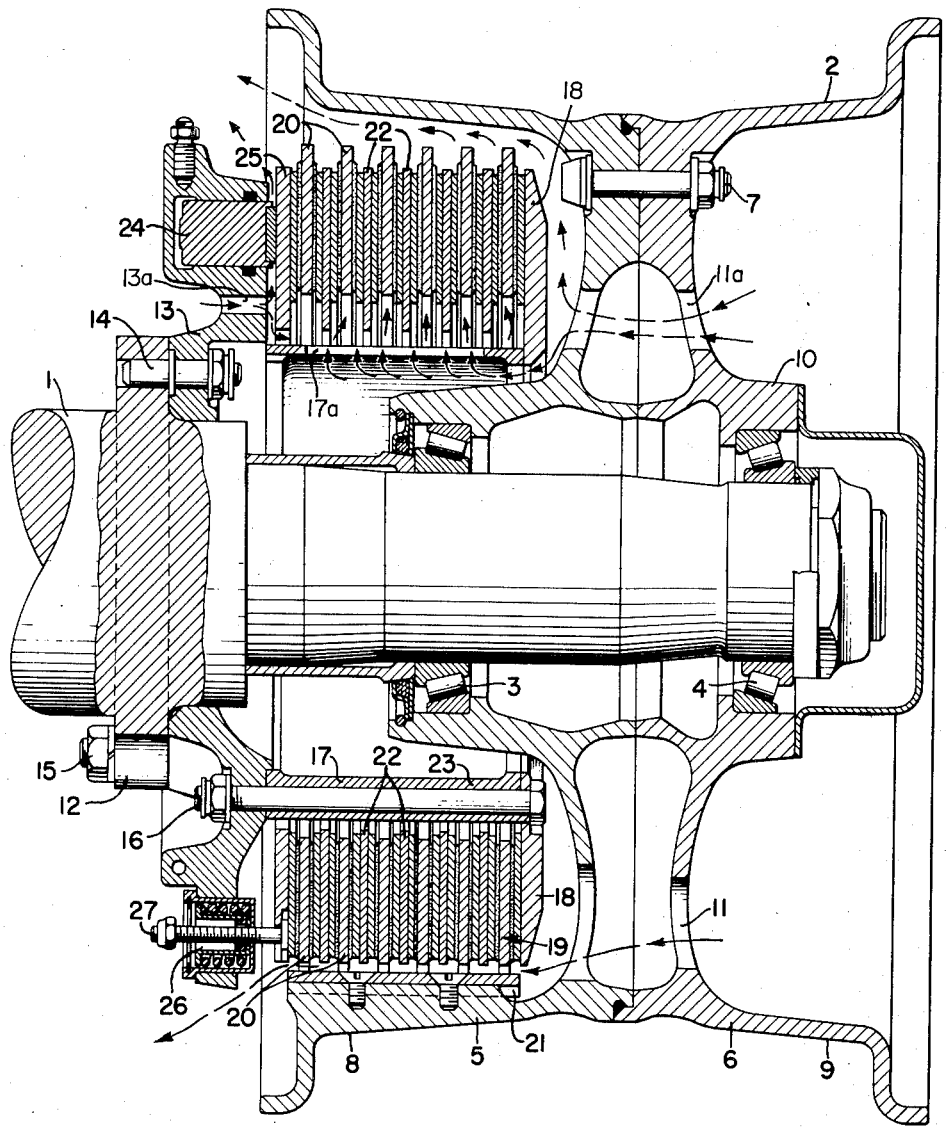
FIG. 2 is a diametric cross-sectional view taken substantially on line 2—2 of FIG. 1.

Also positioned in ears 34 extending from the torque plate 13 at circumferentially spaced points therein and at a radial distance near the outer periphery of the disks 19, are a plurality of fans each indicated as a whole by the numeral 28. Each fan 28 includes blade portions 29 fixed to a shaft 30 which is parallel to the axle 1 and which is driven by a high speed motor 31, all arranged as shown in FIG. 3, and capable of turning the fan 29 at, for example, 20,000 r.p.m. This will pull cooling air through the openings 11 and 11a in the flange of the wheel 2 and the openings 13a in the torque plate 13, and pass the air over and through the stack of disks 19, across the exposed portions of the pistons 24, and under the inner bead seat 8, all as indicated by the arrows showing air flow through the brake during the operation of the fans 28. All of the motors 31 of the fans 28 are electrically connected together so that the fans can be operated simultaneously.

The operation of the fans in the manner described operates to pull separate columns of cooling air (1) Over the outer periphery of the stack of brake discs 19, (2) Up and through the stack of brake disks 19 by passage through the lightening holes 17a when the brake is not in braking operation, (3) Under the inner tire bead retaining seat 8, and (4) Across the exposed portions of the hydraulic pistons 24. The fans 28 may be operated during braking action, but this is usually only a period of about 15 to 30 seconds, so the main cooling effect is achieved with the brake in a static non-operative condition after heat has been generated during the stop. The cooling achieved is to the inner bead retaining seat, the fluid cavities, and the disk stack. In this manner the turn around time of an airplane, for example, can be materially reduced.

Each fan 28 and its motor assembly is mounted as a unit in the appropriate openings in the ears 34 extending outwardly from the torque plate 13, and this can be conveniently accomplished by means of a shield 32 held removably against the torque plate 13 by means of screws 33 to position each fan assembly 28 in the torque plate.

While a certain representative embodiment and details have been shown for the purpose of illustrating the invention, it will be apparent to those skilled in this art that various changes and modifications may be made therein without departing from the spirit or scope of the invention.

What is claimed is:
1. In an aircraft brake the combination of
 a fixed axle,
 a wheel rotatably mounted on the axle, said wheel having bead seats to mount a pneumatic tire and a radially directed supporting web with circumferentially spaced air passage openings therein,
 a torque plate fixed to the axle,
 a cylindrically shaped torque hub fixed to the torque plate, said hub coaxially surrounding the axle and extending to an adjacent air gap spaced relation with the web of the wheel, said torque hub having a plurality of elongated air passage slots equally spaced therearound and substantially parallel to the axle,
 a stack of brake discs with every other disc being splined to the torque hub and alternate discs being splined to the inside of the wheel,
 hydraulic means carried by the torque plate to controllably engage the stack of discs with each other,
 air passage openings in the torque plate adjacent the radially inward side of said hydraulic means,
 a pressure plate operatively affixed to the torque hub against which the stack of discs is pushed by the hydraulic means, said pressure plate having an air gap clearance with the web of the wheel,
 a plurality of fans mounted at circumferentially spaced points on ears extending from the outer periphery of the torque plate adjacent the outer periphery of the discs and the inner bead seat, and
 an individual high speed motor drive for each fan for drawing air through the air passage openings in the wheel web, the torque plate, and the torque hub, over the outer periphery of the stack of discs, over the hydraulic means, through the stack of discs, under the inner bead seat, and through the fan openings in the torque plate.

2. In a brake the combination of
 a fixed axle,
 a wheel rotatably mounted on the axle, said wheel having bead seats to mount a tire and a supporting web with air passage openings therein,
 a torque plate fixed to the axle,
 a torque hub fixed to the torque plate substantially coaxially surrounding the axle and having a plurality of elongated lightening slots equally spaced therearound,
 a stack of brake discs with every other disc being splined to the torque hub and alternate discs being splined to the inside of the wheel,
 hydraulic means carried by the torque plate to controllably engage the stack of discs with each other,
 a pressure plate operatively affixed to the torque hub against which the stack of discs is pushed by the hydraulic means,
 a plurality of fans mounted on ears extending from the outer periphery of and at circumferentially spaced points in the torque plate, and
 an individual high speed motor drive for each fan for drawing air through the openings in the wheel web and the lightening holes in the torque hub, over the outer periphery of the stack of discs, through the stack of discs, and through the fan openings in the torque plate.

3. A brake as called for in claim 2 where the pressure plate and the torque hub are both mounted in spaced relation from the web of the wheel so that air flow may pass through the air passage openings in the web, along the radially inner side of the torque hub, through the lightening holes therein, through the stack of discs, and outout through the fan openings in the torque plate.

4. A brake according to claim 2 where an air passage opening is positioned adjacent the radially inner side of the hydraulic means so that air drawn by the fan may pass therethrough over the hydraulic means and out through the fan openings in the torque plate.

References Cited by the Examiner

UNITED STATES PATENTS

| | | | |
|---|---|---|---|
| 1,742,804 | 1/1930 | Carhart | 192—113 |
| 2,437,670 | 3/1948 | Adamson | 192—113 X |
| 2,708,011 | 5/1955 | Ronning | 188—264 |
| 2,922,495 | 1/1960 | Griswold | 188—264 |
| 2,959,255 | 11/1960 | White | 188—264 |
| 3,010,543 | 11/1961 | Pear | 188—264 X |

FOREIGN PATENTS 1,110,529 7/1961 Germany.

ARTHUR L. LA POINT, *Primary Examiner.*
EUGENE G. BOTZ, *Examiner.*